(12) United States Patent
Loewen et al.

(10) Patent No.: US 11,525,374 B2
(45) Date of Patent: Dec. 13, 2022

(54) SYSTEMS AND METHODS FOR STEAM REHEAT IN POWER PLANTS

(71) Applicant: GE-Hitachi Nuclear Energy Americas LLC, Wilmington, NC (US)

(72) Inventors: Eric P. Loewen, Wilmington, NC (US); Scott E. Rasmussen, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 222 days.

(21) Appl. No.: 16/914,418

(22) Filed: Jun. 28, 2020

(65) Prior Publication Data

US 2020/0325798 A1 Oct. 15, 2020

Related U.S. Application Data

(63) Continuation of application No. PCT/US2018/050318, filed on Sep. 11, 2018, which
(Continued)

(51) Int. Cl.
*F01K 7/38* (2006.01)
*G21D 5/16* (2006.01)
(Continued)

(52) U.S. Cl.
CPC .......... *F01K 7/38* (2013.01); *F01K 7/345* (2013.01); *F01K 7/44* (2013.01); *F01K 11/02* (2013.01);
(Continued)

(58) Field of Classification Search
CPC ... F01K 7/38; F01K 7/345; F01K 7/44; F01K 11/02; F01K 19/00; F22B 1/023;
(Continued)

(56) References Cited

U.S. PATENT DOCUMENTS 3,060,107 A 10/1962 Smith
3,660,231 A 5/1972 Fox et al.
(Continued)

FOREIGN PATENT DOCUMENTS

EP 2320139 5/2011
JP 47-021501 10/1972
(Continued)

OTHER PUBLICATIONS

EPO, Extended European Search Report in corresponding EP App. 18895244.4, dated Aug. 13, 2021.
(Continued)

*Primary Examiner* — Hoang M Nguyen
(74) *Attorney, Agent, or Firm* — Ryan Alley IP (57) ABSTRACT

Steam generators in power plants exchange energy from a primary medium to a secondary medium for energy extraction. Steam generators include one or more primary conduits and one or more secondary conduits. The conduits do not intermix the mediums and may thus discriminate among different fluid sources and destinations. One conduit may boil feedwater while another reheats steam for use in lower and higher-pressure turbines, respectively. Valves and other selectors divert steam and/or water into the steam generator or to other turbines or the environment for load balancing and other operational characteristics. Conduits circulate around an interior perimeter of the steam generator immersed in the primary medium and may have different cross-sections, radii, and internal structures depending on contained. A water conduit may have less flow area and a tighter coil radius. A steam conduit may include a swirler and rivulet stopper to intermix water in any steam flow.

20 Claims, 9 Drawing Sheets

Related U.S. Application Data is a continuation of application No. 15/857,532, filed on Dec. 28, 2017, now abandoned.

(51) Int. Cl.
| | |
|---|---|
| *F22B 1/02* | (2006.01) |
| *F01K 19/00* | (2006.01) |
| *F01K 7/34* | (2006.01) |
| *F01K 7/44* | (2006.01) |
| *F01K 11/02* | (2006.01) |
| *G21D 5/12* | (2006.01) |
| *G21D 1/00* | (2006.01) |

(52) U.S. Cl.
CPC .............. *F01K 19/00* (2013.01); *F22B 1/023* (2013.01); *G21D 1/006* (2013.01); *G21D 5/12* (2013.01); *G21D 5/16* (2013.01)

(58) Field of Classification Search
CPC .......... F22B 1/063; G21D 1/006; G21D 5/12; G21D 5/16; Y02E 30/00
USPC ................................ 60/644.1, 653, 677–679
See application file for complete search history.

(56) References Cited

U.S. PATENT DOCUMENTS

| | | | |
|---|---|---|---|
| 3,882,933 A * | 5/1975 | Kube .................... | F22B 1/1823 165/DIG. 438 |
| 4,072,563 A | 2/1978 | McDonald et al. | |
| 4,303,475 A * | 12/1981 | Hum .................... | F22B 1/1823 376/394 |
| 4,336,105 A * | 6/1982 | Silvestri, Jr. ............ | F01K 3/262 976/DIG. 300 |
| 4,446,820 A | 5/1984 | Jansing et al. | |
| 4,737,337 A | 4/1988 | Garabedian et al. | |
| 4,905,757 A | 3/1990 | Boardman et al. | |
| 5,006,303 A | 4/1991 | Rowlands | |
| 5,772,793 A | 6/1998 | Ashcroft et al. | |
| 7,961,835 B2 | 6/2011 | Keller | |
| 2006/0219395 A1* | 10/2006 | Le Mer .................... | F24H 8/00 165/163 |
| 2006/0226012 A1 | 10/2006 | Kanagasabapathi et al. | |
| 2010/0316181 A1 | 12/2010 | Thorne | |
| 2011/0056201 A1 | 3/2011 | Kluge et al. | |
| 2011/0240267 A1 | 10/2011 | Blanc | |
| 2013/0186089 A1 | 7/2013 | Bruckner et al. | |
| 2015/0033742 A1 | 2/2015 | Garcia et al. | |
| 2015/0184845 A1 | 7/2015 | Lobscheid | |
| 2016/0032784 A1* | 2/2016 | Schüle .................... | F01K 7/345 122/1 B |

FOREIGN PATENT DOCUMENTS

| | | |
|---|---|---|
| JP | 58-048894 | 3/1983 |
| JP | 59-217498 | 12/1984 |
| JP | 61-022721 | 6/1986 |
| JP | 08-152281 | 6/1996 |
| WO | 2016130186 | 8/2016 |

OTHER PUBLICATIONS

Y.H. Jeong, Attributes of a Nuclear-Assisted Gas Turbine Power Cycle, Feb. 2005, Nuclear Energy and Sustainability Program.

WIPO, Written Opinion in Corresponding PCT Application PCT/US2018/050318, dated Jan. 9, 2019.

WIPO, International Search Report in Corresponding PCT Application PCT/US2018/050318, dated Jan. 9, 2019.

EPO, Examination Report in corresponding EP App. 18895244.4, dated Jun. 21, 2022.

JPO, Office Action in corresponding JP App. 2020-536263, dated Jun. 27, 2022.

* cited by examiner

SYSTEMS AND METHODS FOR STEAM REHEAT IN POWER PLANTS

RELATED APPLICATIONS

This application claims priority under 35 U.S.C. § 120 to, and is a continuation of, co-pending International Application PCT/US2018/050318, filed Sep. 11, 2018 and designating the US, which claims priority to application Ser. No. 15/857,532, filed Dec. 28, 2017, such Application also being priority to under 35 U.S.C. § 120. These applications are incorporated by reference herein in their entireties.

BACKGROUND

Figure 1:
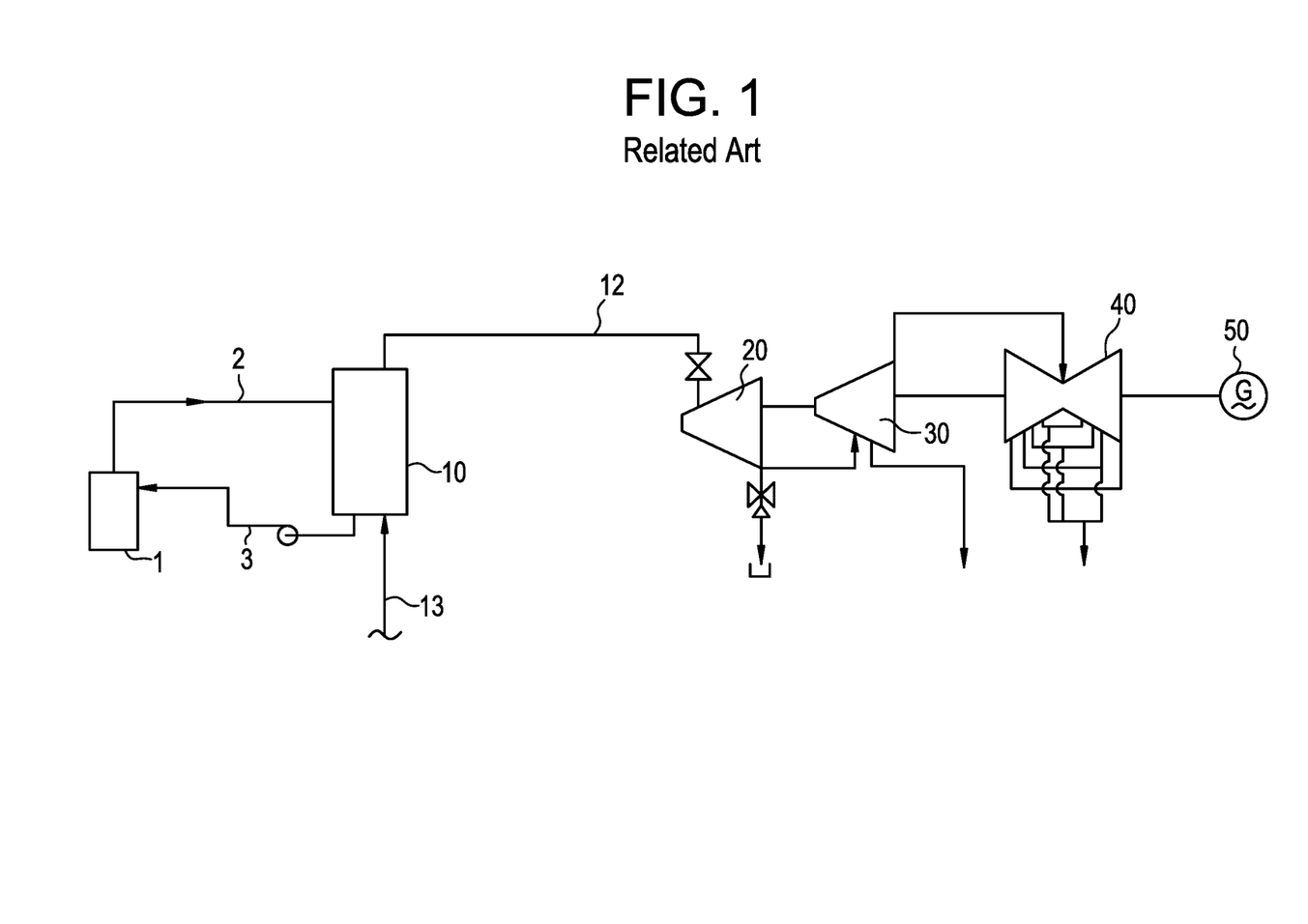
FIG. 1 is a schematic diagram of a related art power plant.

FIG. 1 is a schematic illustration of primary and secondary heat transfer medium loops in a relevant power plant for electricity generation. As seen in FIG. 1, a heat source 1 generates energy that is transmitted to a heat transfer medium. Heat source 1 may be a coal-fired boiler or pressure vessel, light water nuclear reactor, liquid sodium fast reactor, etc. The heat transfer medium flows in a primary loop through source 1 including hot leg or outlet 2 and cold leg or feed 3 between source 1 and heat exchanger 10. In the example of exchanger 10 being a steam generator for a light water reactor, water may be heated in reactor 1 through fission and driven into pipes forming outlet 2, then passed into steam generator as heat exchanger 10. In this example, cooled feedwater from an exit of exchanger 10 may be pumped by main feedwater pumps back into reactor 1 via feed 3 to repeat the cycle.

A secondary heat transfer medium loop is formed by feed or heat exchanger inlet 13 and outlet 12 flowing through heat exchanger 10. Energy from the primary loop is transferred to the secondary loop in heat exchanger 10. In the example of a steam generator as heat exchanger 10, condensed feedwater is pumped from a condenser or other source through inlet 13, converted to steam transferred from the heat of the primary loop in the steam generator, and then fed to outlet 12 to power turbines or other uses. Condensed or otherwise cooled heat transfer medium may be provided to inlet 13 from the turbines via a condenser ejecting excess heat to a heat sink such as a lake or river.

One or more turbines may extract energy from the heat transfer medium exiting heat exchanger 10 via outlet 12. For example, many plants use staged turbines in series, such as intermediate pressure turbine 30 and low pressure turbine 40 to successively extract energy from the heat transfer fluid and drive generator 50. High pressure turbine 20 may also be used with intermediate and lower pressure turbines 30 and 40 in the instance that a saturated fluid from outlet 12 can undergo multiple efficient extractions in each turbine 20, 30, 40. Although not shown, the heat transfer medium finally exiting each turbine may be passed through the condenser or other heat sink and provided back in the loop via inlet 13.

Figure 2A:
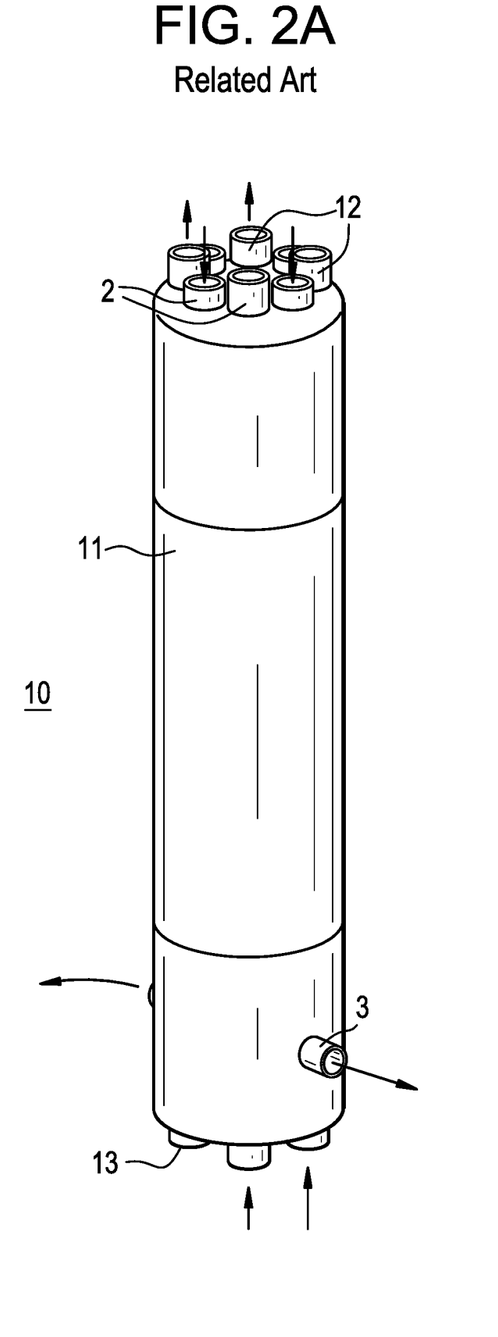
FIG. 2A is an exterior profile view of a related art steam generator.
Figure 2B:
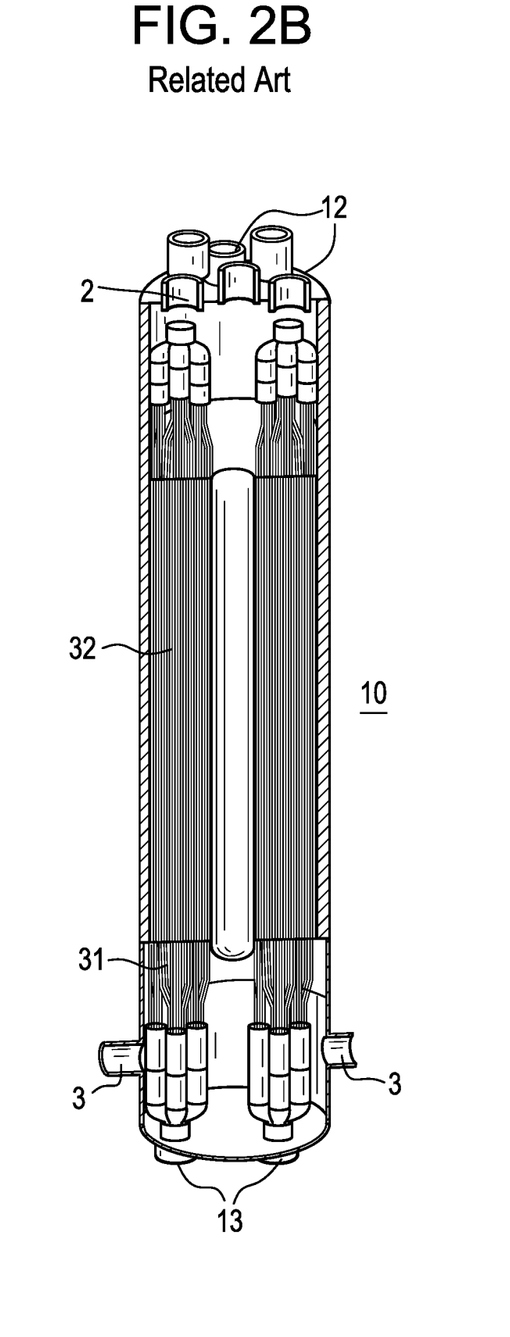
FIG. 2B is an interior cross-sectional view of the related art steam generator of FIG. 2A.

FIGS. 2A and 2B are illustrations of related art liquid sodium steam generators 10 useable as heat exchangers in the system of FIG. 1. Sodium or other liquid metals and salts may be used as a primary loop heat exchange fluid in fast reactors, while water/steam may be provided in the secondary loop for electricity generation. As seen in FIG. 2A, high-temperature sodium enters a top of steam generator 10 via sodium outlet 2 coming from the reactor, and lower-temperature sodium exits a bottom of steam generator 10 to inlet 3 returning to the reactor. Water may take an opposite route, flowing as condensed liquid into a bottom of steam generator inlet 13 and out as saturated or super-saturated steam from steam generator outlet 12 at a top of steam generator 10.

As seen in FIG. 2B, inside steam generator 10 several channels 31 may divide the incoming liquid water into several, potentially over a hundred, different individual flows from inlet 13 into a same number of heat exchange tubes 32. The liquid water flows straight up through heat exchange tubes 32 and boils as it absorbs heat from liquid sodium passing downward inside body 11 around tubes 32 in steam generator 10. Tubes 32 are uniform to ensure even heat transfer and ease fabrication and replacement through uniform design. The liquid sodium is concomitantly cooled as it passes downward in body 11 over heat exchange tubes 32 and ultimately exits steam generator 10 as cooler liquid sodium. The steam exits outlet 12 to power one or more turbines.

SUMMARY

Example embodiment heat exchangers and power plants using the same transfer energy from a primary heat source and heat exchange fluid, like a coal-fired boiler, pressurized water reactor, fast sodium reactor, etc., to a secondary heat exchange fluid from which energy is extracted, such as by a turbine being driven by steam. The heat exchanger may be a steam generator when the secondary heat exchange fluid is water, and it includes one or more primary conduits for the primary heat exchange fluid and one or more secondary conduits for the secondary heat exchange fluid(s). The conduits may be completely separated so the fluids do not intermix, with distinct inlets and outlets useable in separate primary loops and secondary loops. The secondary conduits may thus discriminate among different fluid sources and destinations. For example, if one of the secondary conduits takes in feedwater from a condenser or environmental source, another of the secondary conduits may take in steam from a turbine outlet or other source. The water may be boiled to superheated steam in the first conduit, and the steam reheated to dryer or higher quality steam in the second conduit and then dispatched to same or distinct turbines, such as a higher pressure turbine and a turbine with a lower operating pressure, respectively. In addition to selective connections for different types of fluids in the secondary conduits, plants may use valves and other selectors to divert, in desired volumes or amounts, steam and/or water into the steam generator or to other turbines or the environment for load balancing.

The secondary conduits are a coiled or helix shape around an interior perimeter of the steam generator immersed in the primary heat exchange fluid and may be specially configured based on fluid source or destination. For example, a conduit taking in water for boiling may have only half the flow area as a conduit taking in steam for reheating. Similarly, a conduit carrying steam for reheat may include a fixed swirler on its interior perimeter to better mix in any two-phase flow or a rivulet stopper extending inward in a centripetal direction to break up or redirect water rivulets to a hot exterior surface. Or, for example, two conduits may be axially overlapping or nested, with the conduit carrying water for boiling having a smaller radius of curvature to be more central in the steam generator than a steam conduit for reheating steam having a larger radius of curvature.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and the are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

The Inventors have recognized that typical steam generators accommodate a single type of input or secondary fluid for heating, usually heated, condensed water to boil to saturated or superheated steam, using heat from a primary fluid. For this purpose, interior heat transfer tubes 32 (FIG. 2B) are identical and interchangeable such that each tube may receive the same type of fluid and heat it in a similar manner from any other tube. With a single type of secondary fluid input for the steam generator, the Inventors have recognized there is no opportunity to use primary heat for other types inputs, such as reheating lower pressure steam back up to high quality or superheated steam for energy extraction. Instead, these other types of steam in the secondary loop are fed to progressively lower-pressure turbines. Lower pressure turbines, like turbine 40, used prior to condensation for steam that has already been through one or more higher pressure turbines, are generally less cost effective due to lower energy extraction and frequent damage to turbine blades caused by condensation occurring in lower pressure steam. This inefficiency, combined with a single path from generator to progressively lower-pressure-generator for the secondary fluid, typically requires several expensive lower pressure turbines 40 to derive sufficient energy from the large amount of lower pressure steam. To overcome these problems as well as others, the Inventors have developed example embodiments and methods described below to address these and other problems recognized by the Inventors with unique solutions enabled by example embodiments.

The present invention is steam generators and power production systems using steam generators and methods of using the same. In contrast to the present invention, the few example embodiments and example methods discussed below illustrate just a subset of the variety of different configurations that can be used as and/or in connection with the present invention.

Figure 3A:
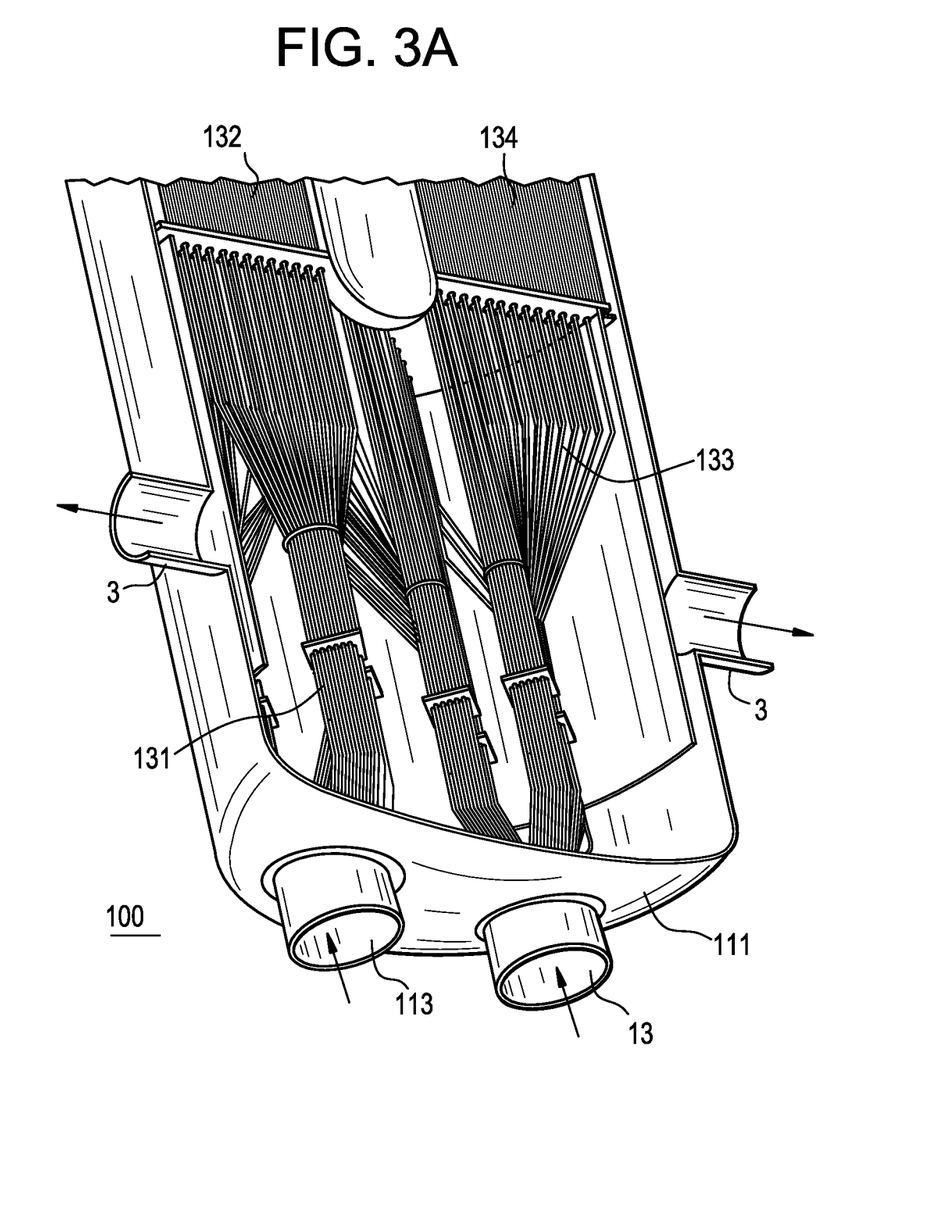
FIG. 3A is a bottom cross-sectional view of an example embodiment steam generator.
Figure 3B:
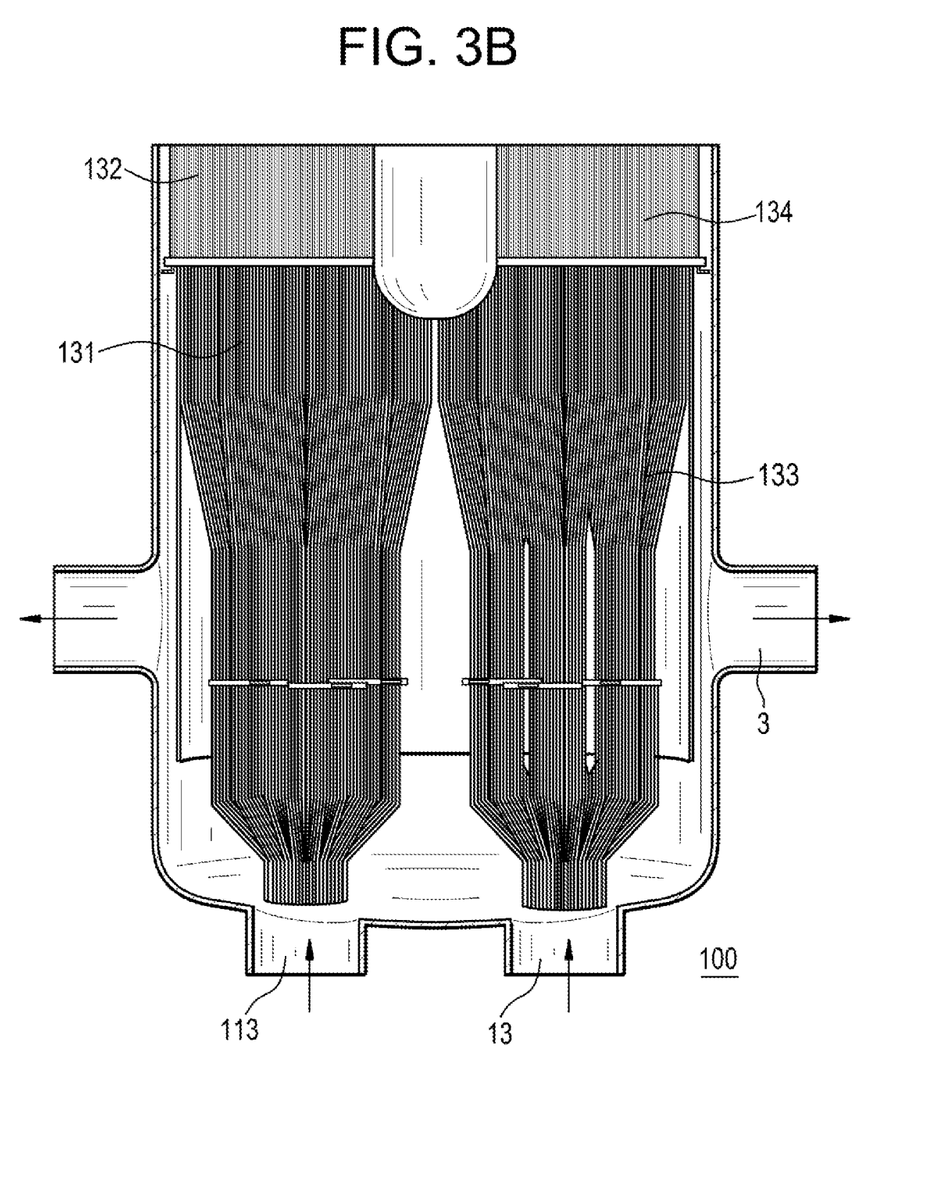
FIG. 3B is a profile cross-sectional view of the example embodiment steam generator of FIG. 3A.

FIG. 3A is a bottom cross-sectional view of an example embodiment steam generator 100 useable in a power generation plant. For example, generator 100 may be installed with a high-temperature fast reactor having a liquid metal or molten salt coolant, including a PRISM sodium-cooled reactor. As shown in FIGS. 3A and 3B, example embodiment steam generator 100 may have an exterior shape and size comparable with typical steam generators and heat exchangers, and may directly replace, for example, relevant steam generator 10 (FIGS. 2A & 2B). Example embodiment steam generator 100 includes several inlets 2 (FIG. 7), potentially at a top end of exterior body 111, including primary coolant inlets 2. For example, the primary inlets may connect to a liquid metal source such as a reactor, in the same configuration as shown by sodium outlets 2 from FIGS. 2A and 2B connecting to steam generator 10. Similarly, as shown in FIGS. 3A and 3B, example embodiment steam generator includes outlets 3, potentially at a bottom end of exterior body 111 opposite the inlets forming feed 3 (FIGS. 2A and 2B) returning to a reactor or other heat source. A heat exchange fluid, such as liquid sodium or a molten salt, may flow from the inlets to the outlets inside body 111, and example embodiment steam generator 100 may be useable to replace steam generators in typical primary coolant loops of heat generating sources, including reactors.

Example embodiment steam generator 100 includes water inlet 13 similar to inlet 13 from FIGS. 2A and 2B, where condensed water may enter generator 100, potentially at a bottom end of body 111. Multiple water channels 133 divide flow from inlet 13 into several, potentially about one hundred, different flows, each in one channel 133. Once divided, channels 133 flow into first heat exchange tubes 134 that ascend into steam generator 100 and allow a hot primary coolant, such as liquid sodium, to flow down around heat exchange tubes 134 in an opposite direction. Although only a single water inlet 13 with water channels 133 is shown in FIGS. 3A and 3B, it is understood that several different inlets may be spaced about steam generator 100.

Figure 4A:
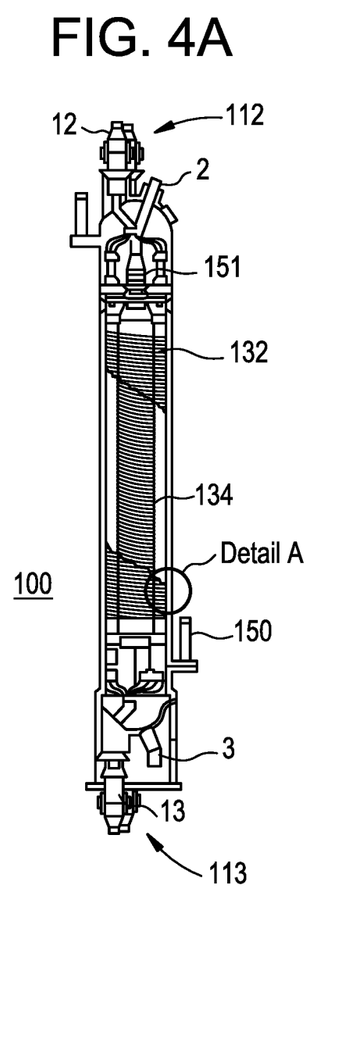
FIG. 4A is a profile cross-sectional view of an example embodiment steam generator.

As seen in FIG. 4A, first heat exchange tubes 134 may be in a helical or coil shape about a central axis of steam generator 100. Tubes 134 may occupy a central portion of steam generator 100, where temperature of counter-flowing primary coolant may be hottest, and a radius of curvature of the helix may be tightest, imparting greatest centrifugal motion to the liquid water. First heat exchange tubes 134 may have a relatively smaller cross-sectional flow path than tubes 132 (described below), but may be larger than tubes 32 (FIG. 2B), because the coiled arrangement will force liquid water to outside tube walls and enhance heat transfer. For example, first heat exchanger tubes 134 may be approximately 30 millimeters to 50 millimeters in diameter.

After travelling up through first heat exchange tubes 134, liquid water from inlet 13 may be super-heated steam, having absorbed significant energy from a primary coolant, such as liquid sodium, pressurized water, etc. flowing around heat exchange tubes 134. At another end of body 111 of steam generator 100, the high-quality steam exits one or more outlet 12, similar to outlets 12 shown in FIGS. 2A and 2B useable in several different types of plants, for delivery to a high-pressure steam turbine and generator. For example, three outlets 12 may be used in combination with three inlets 13 for superheated steam and liquid water, respectively.

As shown in FIGS. 3A and 3B, example embodiment steam generator 100 includes a steam inlet 113 where lower-pressure or lower-quality steam, such as steam already passed through one or more turbines, may enter generator 100 in parallel with liquid water into water inlet 13. Multiple steam channels 131 divide flow from inlet 113 into several, potentially a hundred or more, different flows, each in one steam channel 131. Once divided, steam channels 131 flow into second heat exchange tubes 132 that ascend into steam generator 100 and allow a hot primary coolant, such as liquid sodium, molten salt, etc. to flow down around second heat exchange tubes 132 in an opposite direction. Although only a single steam inlet 113 with steam channels 131 is shown in FIGS. 3A and 3B, it is understood that several different inlets may be spaced about steam generator 100. At another end of body 111 of steam generator 100, the reheated steam exits one or more outlets 112 (FIG. 7) useable in several different types of plants, for delivery an intermediate or higher-pressure steam turbine and generator. For example, three outlets 112 may be used in combination with three inlets 113 for reheated steam and low-pressure steam, respectively.

Figure 4B:
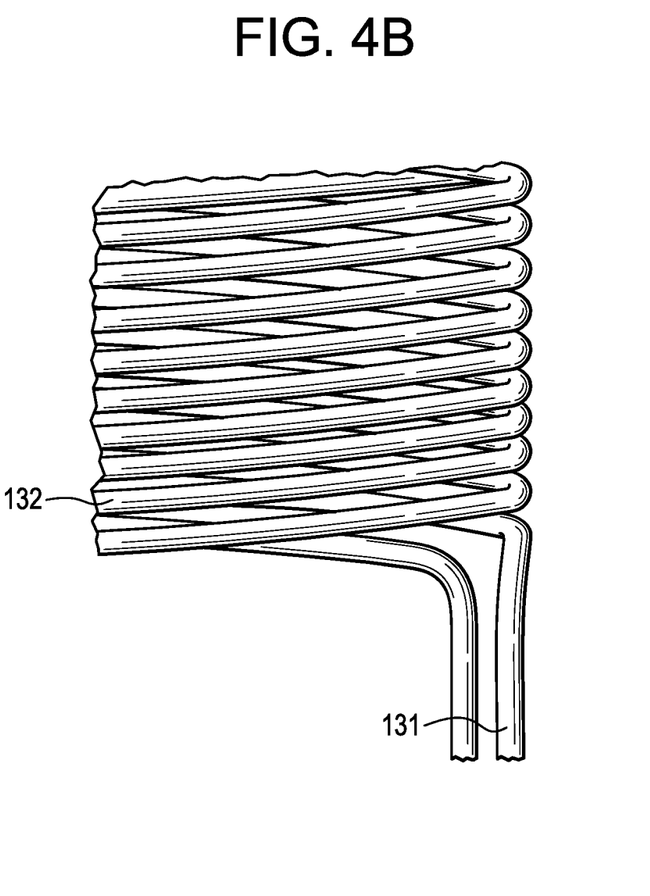
FIG. 4B is a detail view of the example embodiment steam generator of FIG. 4A.

As seen in FIG. 4A, second heat exchange tubes 132 may be in a helical or coil shape about a central axis of steam generator 100. Second heat exchange tubes 132 may occupy an outer portion of steam generator 100, where less heat from counter-flowing primary coolant may be required to re-saturate and/or superheat the steam, and a radius of curvature of the helix may be wider, allowing the faster steam flow to push water droplets to hotter edged through centrifugal motion. A radius of second heat exchange tubes 132 may be larger than that of first heat exchange tubes 134, potentially up to 50 or 100% larger, such as approximately 45 to 100 millimeters in diameter, for example, to reduce pressure drop in the steam and permit higher-pressure steam output. FIG. 4B is a detail illustration of the detail A of FIG. 4A, showing a transition of channels 131 into a coiled shape for second heat exchange tubes 132 proceeding upward about a center of the steam generator.

Figure 5A:
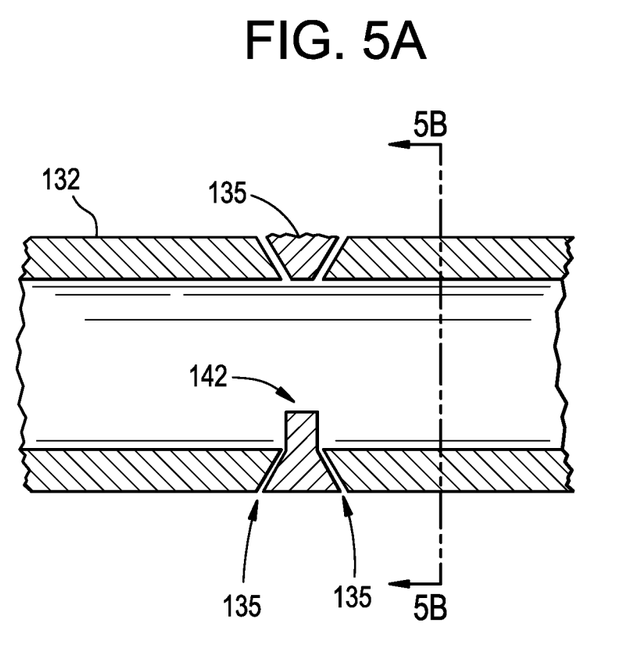
FIG. 5A is a cross-sectional profile view of a heat exchange tube of FIG. 4B.
Figure 5B:
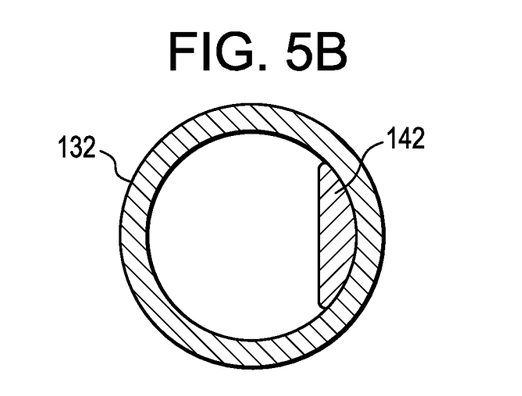
FIG. 5B is a cross-sectional axial view of the heat exchange tube of FIG. 5A.
Figure 6A:
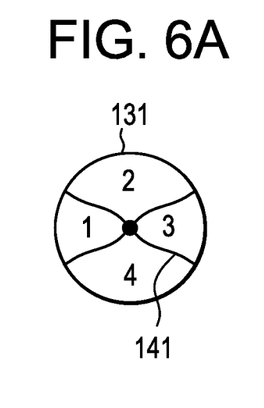
FIGS. 6A-D are cross-sectional axial views of a heat exchange tube at progressive axial positions.
Figure 6B:
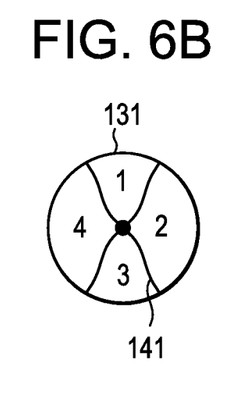
Figure 6C:
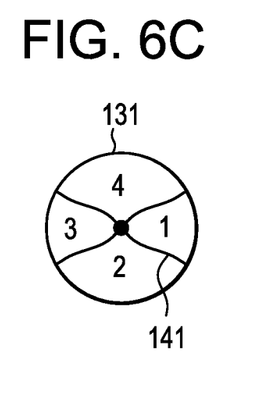
Figure 6D:
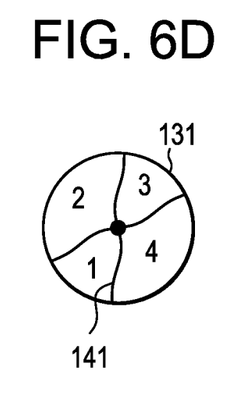

Second heat exchange tubes 132 and steam channels 131 may include one or more features to enhance reheating and drying of a lower-quality steam flowing through the same. As seen in FIGS. 5A and 5B, one or more rivulet stoppers 142 may protrude into each second heat exchange tube 132 to stop rivulets of water in the steam flow. For example, rivulet stoppers 142 may be a blunt insert at weld joints 135 in tubes 132 protruding up to 15% into the flow path from the outer radius of tubes 132. FIG. 5B is a cross-sectional illustration in the axial direction taken along line B-B' of FIG. 5A illustrating rivulet stopper 142 occupying approximately 15% of the flow area in tube 132 from an outer edge of the same in a coil. Rivulet stoppers 142 in this way break up water droplets or rivulets or redirect them to a hot surface of tubes 132.

As shown in FIGS. 6A-6D, fixed swirlers 141 in one or more steam channels 131 may impart an internal rotation or swirl to the steam flowing therein. Fixed swirlers 141 may be two thin, welded divider sheets that separate flow area of channels 131 into four flows 1-4, seen in FIGS. 6A-D. Fixed swirlers 141 may have a pitch-to-diameter ratio of about 3 to about 6 to drive any water droplets to outside perimeter of channels 131 and improve heat transfer and re-evaporation even if lower quality or under-saturated steam enters steam inlet 113. As seen from FIG. 6A through 6D as subsequent downstream positions, rotation of swirlers 141 through axial distance may rotate the distinct flows 1-4 through a complete rotation before exiting swirlers 141 in channel 131. In this way, denser water droplets may be centrifugally driven to hot edges of channel 131 out of a two-phase steam flow to improve vaporization and steam quality.

Figure 7:
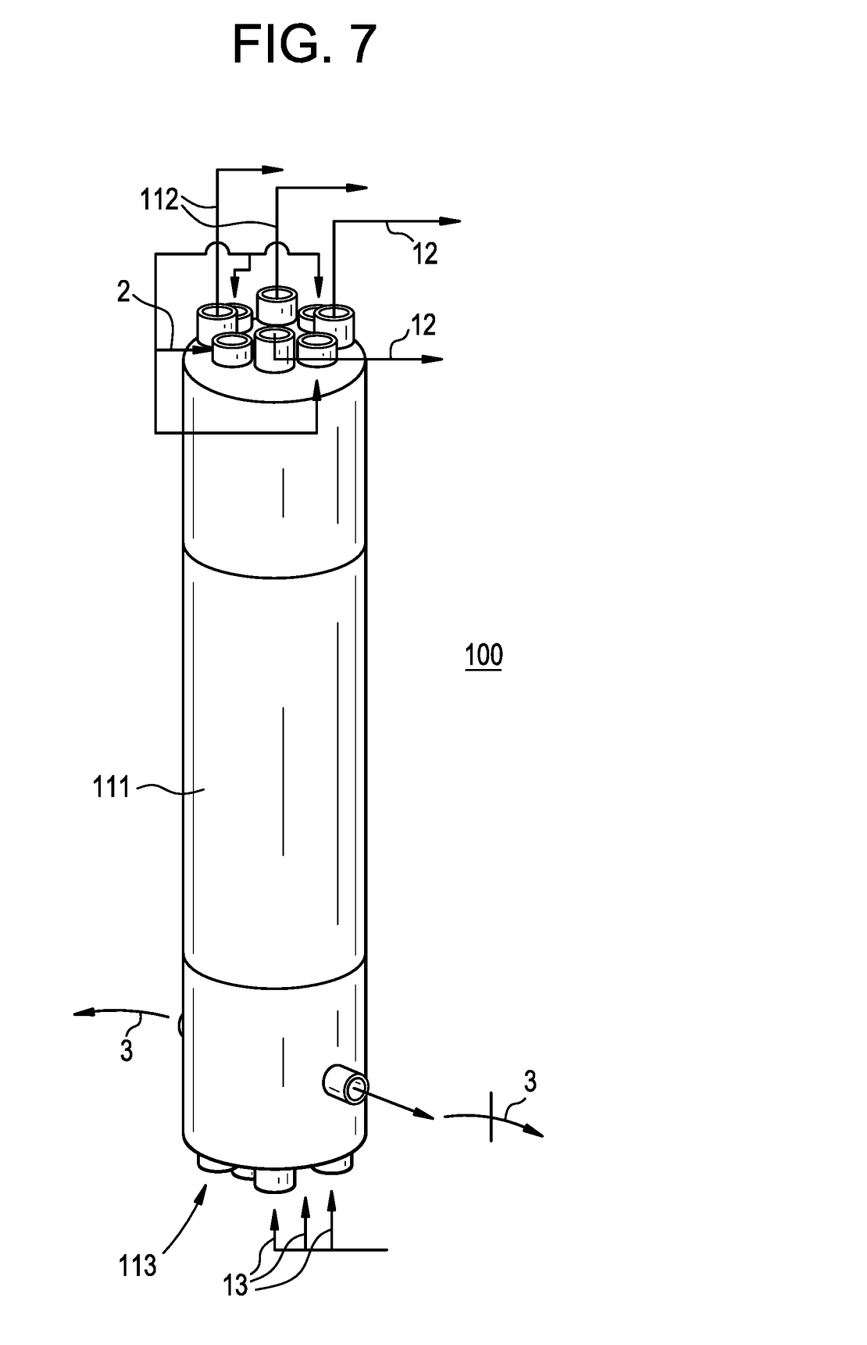
FIG. 7 is a perspective exterior view of the example embodiment steam generator of FIGS. 3-4.

FIG. 7 is a perspective illustration of an exterior of example embodiment steam generator 100 showing several inlets and outlets. As shown in FIG. 7, example embodiment steam generator 100 may thus receive secondary coolant from multiple sources, including both condensed, liquid water and steam, for example, through inlets 13 and 113 and concurrently heat both fluids to higher-quality fluids, such as superheated steam, for use in appropriate turbines, including more efficient non-low-pressure turbines. By positioning secondary fluids capable of absorbing more heat like condensed water in an interior position with tighter curvature helix, and fluids that absorb less heat like low pressure or saturated steam in an exterior position with looser curvature helix, steam generator 100 may efficiently generate higher quality steam from multiple sources useable in higher-pressure turbines. As seen in FIGS. 3-4, the helical arrangement may allow the use of fewer tubes 132 and 134 overall compared to conventional steam turbines, and such tubes 132 and 134 may be larger in diameter, reducing manufacturing complexity, costs, and risk of steam tube failure due to fewer tubes.

As shown in FIG. 7, example embodiment steam generator 100 may include several outlets 12, similar to outlet 12 from FIGS. 2A and 2B, to distribute superheated steam generated from liquid water. Steam generator 100 may also include outlets 112 to connect reheated steam generated from lower pressure steam to desired destinations, potentially based on expected steam type. For example, each outlet 12 and 112 may connect to a high pressure turbine or may each connect to a different turbine. Similarly, outlets may be connected based on expected steam type or path through generator 100. For example, for every three outlets 12 that carry superheated steam produced from liquid condensed water to a high pressure turbine, one outlet 112 may carry potentially lower-quality or lower-pressure steam to an intermediate or lower pressure turbine, all from example embodiment steam generator 100.

Example embodiment steam generator 100 may be fabricated of resilient materials that are compatible with a nuclear reactor environment, and even a high-temperature molten salt or liquid metal primary coolant, without substantially changing in physical properties, such as becoming substantially radioactive, melting, embrittlement, and/or retaining/adsorbing radioactive particulates. For example, several known structural materials, including austenitic stainless steels 304 or 316 and martensitic stainless steels 9Cr-1Mo and 2.25Cr-1Mo for use with molten salts and metals, XM-19, zirconium alloys, nickel alloys, Alloy 600, etc. may be chosen for any element of components of example embodiment steam generators. Joining structures and directly-touching elements may be chosen of different and compatible materials to prevent fouling.

Figure 8:
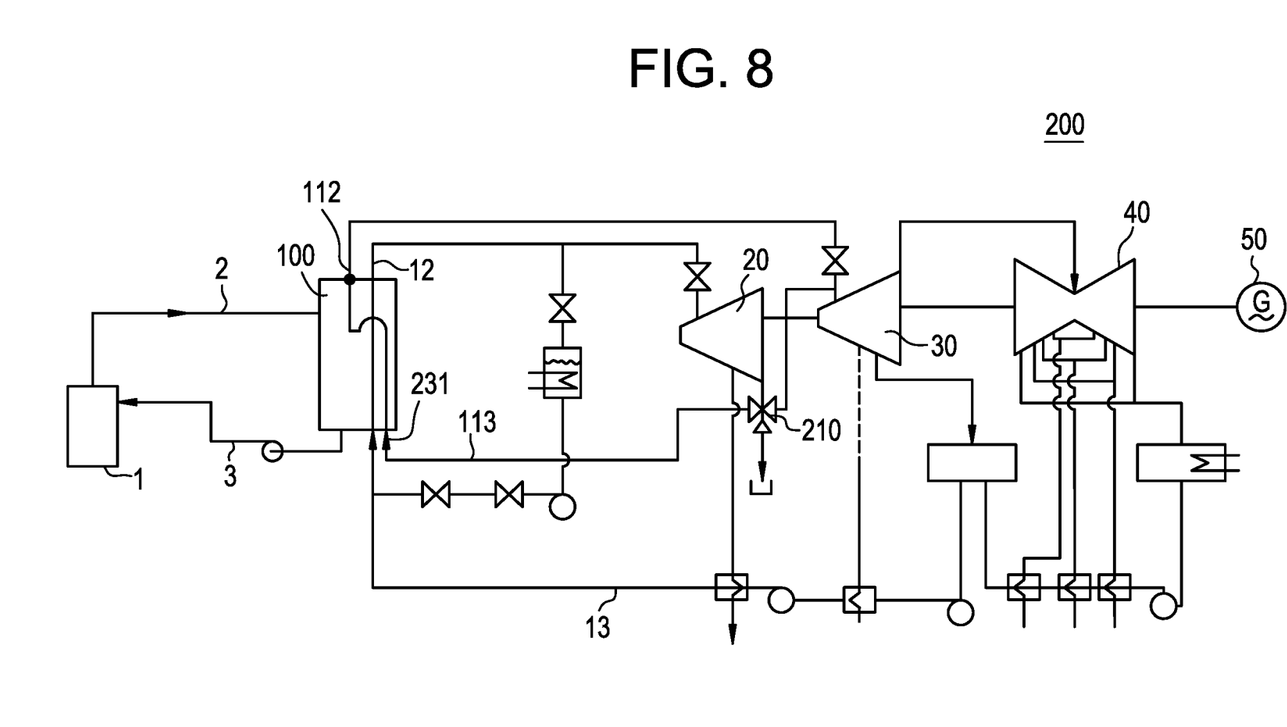
FIG. 8 is a schematic diagram of an example embodiment power plant using an example embodiment steam generator.

FIG. 8 is a schematic of an example embodiment power plant having a secondary loop energy generation system 200 that uses an example embodiment steam generator 100. In example system 200, steam generator 100 may receive both liquid water and lower pressure steam from different sources and outlet steam to different turbines. For example, as shown in FIG. 8, several different turbines may be used, including high pressure turbine 20, intermediate pressure turbine 30, and lower pressure turbine 40, all connected in series with generator 50 or to individual generators. Each turbine 20, 30, and 40 is configured with volume, speed, and turbine blade characteristics to best extract energy from steam in different pressure ranges. Turbines 20, 30, and 40 may include steam outlets for steam exiting the turbine at lower pressures that are no longer useable for energy extraction, and these steam flows may supply the next lower-pressure turbine with steam. For example, high pressure turbine 20 may include an outlet for steam to flow into intermediate pressure turbine 30, and intermediate turbine 30 may include an outlet for steam to flow into lower pressure turbine 40. Steam may at any point be cycled to a condenser and condensed to liquid water for water inlet 13.

Example embodiment steam generator 100 in system 200 is connected to a primary coolant loop including reactor 1, outlet 2, and feed 3 which may be a primary liquid sodium loop in a faster reactor that may reach temperatures up to around 500° C. Steam generator 100 is also connected to water inlet 13 and lower pressure steam inlet 113 to generate superheated, high-pressure, and/or higher-quality steam from these flows using the heat from the sodium. For example, three water inlets 13 from a condenser and one steam inlet 113 may flow into steam generator 100, with three steam outlets 12 and one reheat outlet 112 exiting the same. As shown in FIG. 7, steam generator 100 includes outlets 12 and 112 going to different destinations—high pressure turbine 20 and intermediate pressure turbine 30, respectively. For example, reheated steam from inlet 113 may be redirected to intermediate turbine 30 from steam generator 100 via outlet 112. Water from inlet 13 may be redirected to high pressure turbine 20 from steam generator 100 via outlet 12.

In this way, more steam may be put through intermediate pressure turbine 40. Reheating steam to higher-quality levels or superheat conditions and extracting energy in a higher pressure turbine is more efficient than simply passing outlet steam into successively lower-pressure turbines. Thus, example embodiment plant system 200 is seen to have higher efficiency than, for example, the plant of FIG. 1. Further, fewer low pressure turbines 40, in favor of more intermediate pressure turbines 30, may be required or used in system 200, which may be advantageous given the lower efficiency and increased size of lower pressure turbines compared to high pressure turbine 20 and intermediate pressure turbine 30. Similarly, generated or reheated steam from steam generator 100 may be higher quality and thus "dryer" than steam outlet from high pressure turbine 20 and intermediate pressure turbine 30, providing a better working medium that will not degrade turbine blades as quickly.

Several valves in example embodiment system 200 may allow selective direction of steam for reheating in example embodiment steam generator 100, condensation, or energy extraction in particular turbines. For example, as shown in FIG. 8, a three-way valve 210 may allow steam coming from high-pressure turbine 20 to be directed to any of intermediate-pressure turbine 30, inlet 113 to flow into steam generator 100, or through a condenser to exit the system and/or potentially recycle back to water inlet 13 following condensation. Similarly, a master valve 231 on inlet 113 to steam generator 100 may prevent reheating of any steam through steam generator 100 should system 200 require less energy throughput. In this way, an operator can instantly and reversibly change the load on each of turbines 20, 30, and 40 as well as steam generator 100 by changing the level of redirected steam to generator 100, intermediate pressure turbine 30, and/or the environment via the condenser. Such changes do not require changing power output from reactor 1 or other power source, putting less demand on any control system or duty limits for the same.

Example embodiments and methods thus being described, it will be appreciated by one skilled in the art that example embodiments may be varied and substituted through routine experimentation while still falling within the scope of the following claims. For example, although a sodium primary coolant and water secondary coolant are described, other coolant types and heat sources can be used simply through proper material selection and configuration of example embodiments—and fall within the scope of the claims. Such variations are not to be regarded as departure from the scope of these claims.

What is claimed is:

1. A heat exchanger for transferring energy among multiple sources in a power generation plant, the heat exchanger comprising:
   a primary inlet;
   a primary outlet, wherein the primary inlet and the primary outlet are configured to join to different ends of a heat source separate from the heat exchanger so as to form a loop for a primary heat exchange fluid through the heat source and the heat exchanger;
   a first secondary conduit inside the heat exchanger configured to directly contact the primary heat exchange fluid flowing through the heat exchanger, wherein the first secondary conduit includes a plurality of first heat exchange tubes configured to carry a secondary heat exchange fluid; and
   a second secondary conduit separate from the first secondary conduit inside the heat exchanger, wherein the second secondary conduit is configured to directly contact the primary heat exchange fluid flowing through the heat exchanger and includes a plurality of second heat exchange tubes configured to carry the secondary heat exchange fluid having a different energy from the secondary heat exchange fluid in the first heat exchange tubes, and wherein the first heat exchange tubes have a different flow area from the second heat exchange tubes.

2. The heat exchanger of claim 1, wherein the first heat exchange tubes have a first internal diameter and a first helical curvature, and wherein the second heat exchange tubes have a second internal diameter and a second helical curvature distinct from the first internal diameter and the first helical curvature.

3. The heat exchanger of claim 2, wherein the first secondary conduit includes a first inlet and outlet, wherein the second secondary conduit includes a second inlet and outlet, and wherein the first inlet and outlet and second inlet and outlet are entirely distinct from one another on ends of the heat exchanger.

4. The heat exchanger of claim 2, wherein the second internal diameter is approximately 50% to 100% larger than the first internal diameter, and wherein the second helical curvature is larger than the first helical curvature, and wherein there are at least twice as many first secondary conduits as the second secondary conduit.

5. The heat exchanger of claim 4, wherein the first secondary conduit and the second secondary conduit are at a same axial level such that the first secondary conduit is more central to the heat exchanger than the second secondary conduit.

6. The heat exchanger of claim 2, further comprising:
   two more of the first secondary conduits and two more of the second secondary conduits so as to include at least three of the first secondary conduits and three of the second secondary conduits.

7. The heat exchanger of claim 1, wherein the second secondary conduit includes a swirler fixed to an internal wall of the conduit so as to swirl a secondary heat exchange fluid flowing through the second secondary conduit.

8. The heat exchanger of claim 1, wherein the second secondary conduit includes a rivulet stopper extending inward toward a center of the helical path so as to break up rivulets in a secondary heat exchange fluid flowing through the second secondary conduit.

9. The heat exchanger of claim 1, wherein the first secondary conduit includes a plurality of flow dividers and a single inlet so as to separate a secondary heat exchange fluid into the first heat exchange tubes.

10. A power generation plant including:
    a heat source heating a primary heat exchange fluid;
    a first turbine extracting energy from a secondary heat exchange fluid; and
    a steam generator for transferring energy among the primary and the secondary heat exchange fluids in the power generation plant, the steam generator including,
      a primary inlet,
      a primary outlet, wherein the primary inlet and the primary outlet join to different ends of the heat source so as to form a loop for the primary heat exchange fluid through the heat source and the steam generator,
      a first secondary conduit inside the steam generator configured to directly contact the primary heat exchange fluid flowing through the steam generator, wherein the first secondary conduit includes a plurality of first heat exchange tubes configured to carry the secondary heat exchange fluid, and wherein the first secondary conduit includes a first secondary outlet joined to the first turbine, and
      a second secondary conduit inside the steam generator entirely separate from the first secondary conduit and configured to directly contact the primary heat exchange fluid flowing through the steam generator, wherein the second secondary conduit includes a plurality of second heat exchange tubes configured to carry the secondary heat exchange fluid having a different energy from the secondary heat exchange fluid in the first heat exchange tubes, and wherein the first heat exchange tubes have a different flow area from the second heat exchange tubes.

11. The plant of claim 10, wherein the first heat exchange tubes have a first internal diameter and a first helical curvature, and wherein the second heat exchange tubes have a second internal diameter and a second helical curvature distinct from the first internal diameter and the first helical curvature.

12. The plant of claim 11, wherein the first secondary conduit further includes a first secondary inlet, wherein the second secondary conduit includes a second secondary inlet and outlet, and wherein the first secondary inlet and outlet and second secondary inlet and outlet are entirely distinct from one another on ends of the steam generator.

13. The plant of claim 12, further comprising:
    a condensed water feed, wherein the first secondary inlet is connected to the condensed water feed, wherein the first secondary conduit is configured to contain and boil water from the feed into superheated steam, wherein the second secondary inlet is connected to a steam outlet of the first turbine, and wherein the second secondary conduit is configured to contain and reheat steam from the steam outlet.

14. The plant of claim 13, further comprising:
    a second turbine having a lower operating pressure than the first turbine, wherein the second secondary outlet is connected to and provides the reheated steam to the second turbine, and wherein the first secondary outlet is connected to and provides the superheated steam to the first turbine.

15. The plant of claim 14, further comprising:
a valve between the steam outlet of the first turbine, the second turbine, and the second secondary inlet, wherein the valve is operable to redirect steam from the steam outlet to the second turbine and the second secondary inlet in desired proportions.

16. The plant of claim 11, wherein the primary heat exchange fluid is liquid sodium, wherein the heat source is a fast nuclear reactor, and wherein the secondary heat exchange fluid is liquid and/or gaseous water.

17. The plant of claim 11, wherein the second internal diameter is approximately 50% to 100% larger than the first internal diameter, and wherein the second helical curvature is larger than the first helical curvature, and wherein there are at least twice as many first secondary conduits as the second secondary conduit.

18. The plant of claim 11, wherein the steam generator further includes,
two more of the first secondary conduits and two more of the second secondary conduits so as to include at least three of the first secondary conduits and three of the second secondary conduits.

19. The plant of claim 10, wherein the second secondary conduit includes a swirler fixed to an internal wall of the conduit so as to swirl the secondary heat exchange fluid flowing through the second secondary conduit, and wherein the second secondary conduit includes a rivulet stopper extending inward toward a center of a helical path of the second secondary conduit so as to break up rivulets in the secondary heat exchange fluid flowing through the second secondary conduit.

20. A steam generator for transferring energy among multiple sources in a power generation plant, the steam generator comprising:
a primary inlet;
a primary outlet, wherein the primary inlet and the primary outlet are configured to join to different ends of a heat source separate from the steam generator so as to form a loop for a primary heat exchange fluid through the heat source and the steam generator;
a first secondary conduit inside the steam generator configured to directly contact the primary heat exchange fluid flowing through the steam generator, wherein the first secondary conduit includes a plurality of first heat exchange tubes configured to carry the secondary heat exchange fluid; and
a second secondary conduit separate from the first secondary conduit inside the steam generator, wherein the second secondary conduit is configured to directly contact the primary heat exchange fluid flowing through the steam generator and includes a plurality of second heat exchange tubes configured to carry the secondary heat exchange fluid, wherein,
the first heat exchange tubes have a first internal diameter and a first helical curvature,
the second heat exchange tubes have a second internal diameter approximately 50% to 100% larger than the first internal diameter and a second helical curvature larger than the first helical curvature, and
the second heat exchange tubes include a swirler fixed to an internal wall so as to swirl a secondary heat exchange fluid and a rivulet stopper extending inward toward a center of the helical curvature so as to break up rivulets in the secondary heat exchange fluid.

* * * * *